Feb. 11, 1969   J. P. S. CURRAN   3,426,801
VARIABLE FLOW METERING DEVICES
Filed July 20, 1966

United States Patent Office 3,426,801
Patented Feb. 11, 1969

1

3,426,801
VARIABLE FLOW METERING DEVICES
John Patrick Stewart Curran, Burnley, England, assignor to Joseph Lucas (Industries) Limited, Birmingham, England
Filed July 20, 1966, Ser. No. 566,532
U.S. Cl. 138—46       2 Claims
Int. Cl. F16k 3/34, 3/26

This invention relates to variable flow fluid metering devices of the kind comprising an inner tube mounted within a fixed sleeve, for axial movement therein, and a movable sleeve coaxial with and slidably mounted on the inner tube, the inner tube having an axially tapering opening through which fluid can flow when the opening registers with a space defined between the fixed and movable sleeves.

The object of the invention is to provide a variable flow metering device of the kind specified in a convenient form.

In accordance with the present invention, a variable flow fluid metering device of the kind specified is characterised in that the inner tube has two axially spaced axially tapering openings of different circumferential dimensions and of equal lengths, and there are two fixed sleeves, between the mutually presented ends of which the movable sleeve is disposed, the length of the movable sleeve being equal to the distance between the wider ends of the two openings respectively, one of the mutually presented pairs of ends of the fixed and movable sleeves having a different radial depth to the radial depth of the other of the pairs of ends, the pair with the smaller radial depth being arranged to be adjacent to the opening with the wider circumferential dimension at its wider end, the arrangement being such that when the spaces between the movable sleeve and the respective fixed sleeves are equal, the relationship between the exposed areas of the openings and the radial depths of the sleeve ends tends to create a balance of the forces acting axially upon the movable sleeve at opposite ends thereof.

Figure 1:
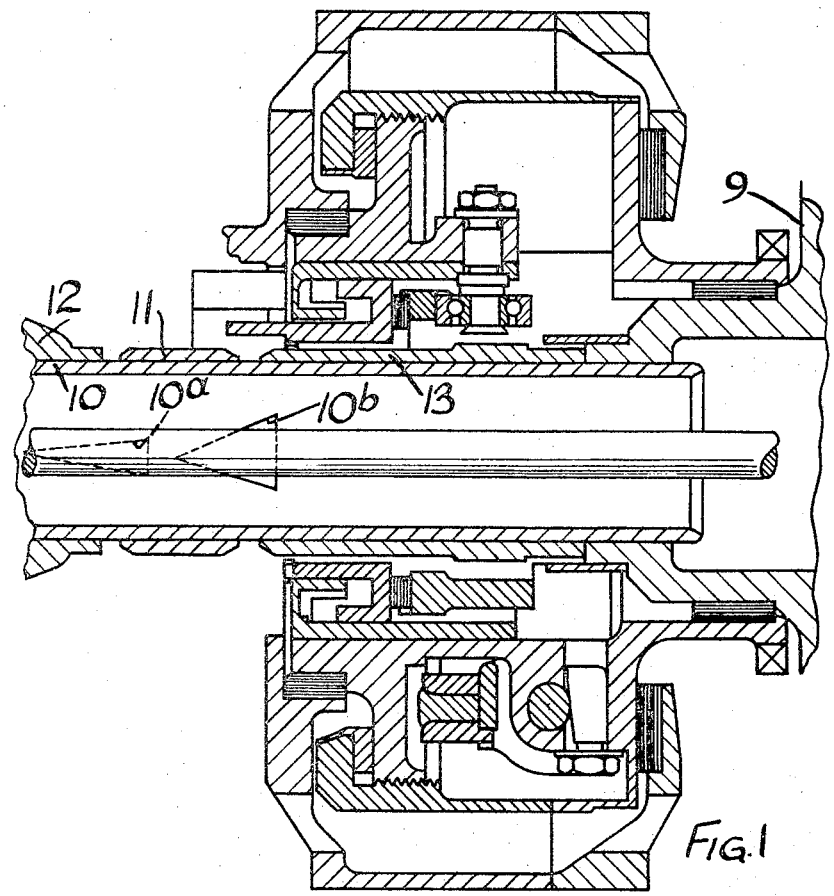
Figure 2:
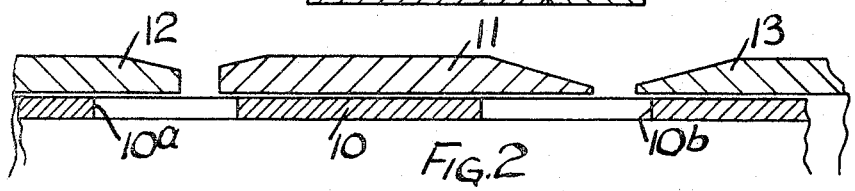
Figure 3:
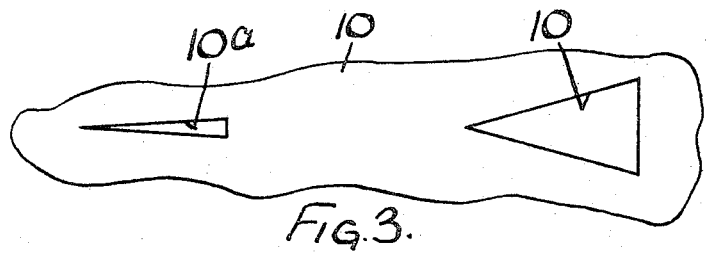

The invention will now be described by way of example, with reference to the accompanying drawings in which:

FIGURE 1 is a cross-sectional view of part of an aircraft gas turbine engine fuel system incorporating a device constructed in accordance with this invention, FIGURE 2 is a fragmentary enlarged cross-sectional side elevation view of the device in FIGURE 1 and FIGURE 3 is an enlarged fragmentary view of the inner tube of the device shown in FIGURE 2.

In this example, the system for use in an aircraft for metering fuel to the gas turbine engine, is shown in part in FIGURE 1 and comprises a relatively fixed structure 9 which incorporates means (not shown) for controlling the position of an inner sleeve 10 in response to engine speed and further means (not shown) for controlling the position of a movable outer sleeve 11 slidably mounted on the inner tube 10. The fixed structure defines a pair of spaced fixed sleeves 12, 13 surrounding the inner tube 10 the ends of which, as illustrated allow limited movement of the movable sleeve 11.

The inner tube 10 has a pair of axially spaced triangular openings 10a, 10b of different base length, the bases extending circumferentially of the tube. The length of the movable sleeve 11 is equal to the distance between the bases of the openings 10a, and 10b, and the mutually presented pairs of end faces of the movable and fixed sleeves 11, 12, 13 respectively are of different radial depth, the pair with the smaller radial depth being arranged to be adjacent to the larger based opening 10b, and the pair

2 with larger radial depth being arranged to be adjacent to the smaller based opening 10a, as illustrated clearly in FIGURE 1.

In use the inner tube 10 is connected for rotation with, and axial movement with a movable part of a maximum speed spring loaded governor (not shown) driven by the engine. The rating of the spring loading is dependent upon the setting of a manual control, the setting of this control therefore determining the axial position of the inner tube 10 with respect to the fixed sleeves 12 and 13. The movable sleeve 11 is connected to an acceleration control device (not shown) whereby the sleeve 11 is movable axially in one direction under acceleration conditions and in the other direction under deceleration conditions. Under normal steady running conditions, however, the movable sleeve 11 is disposed to define equal spaces between its ends and the adjacent ends of the respective fixed sleeves 12 and 13.

Fuel is permitted to occupy the space surrounding the device so that it flows under pressure through both openings 10a, 10b into the interior of the inner tube 10.

Under the steady running conditions, the forces acting at the opposite ends of the movable sleeve 11, derived from the pressure of fluid flowing therethrough, tend to be substantially balanced so that the movable sleeve 11 tends to maintain its position to define equal spaces. This balance is achieved by providing that the radial depths of the pairs of sleeve ends are in the inverse proportion to the exposed areas of their adjacent openings, this relationship being true irrespective of the relative axial positions of the inner tube 10 and movable sleeve 11.

Having thus described my invention what I claim as new and desire to secure by Letters Patent is:

1. A variable flow fluid metering device comprising an inner tube, a pair of fixed outer sleeves within which the inner tube is slidable axially, a movable outer sleeve coaxial with and disposed between the mutually presented ends of the fixed outer sleeves, said movable outer sleeve also being axially slidable relatively to the inner tube, the inner tube having two axially spaced axially tapering openings of different circumferential dimensions and of equal lengths, the length of the movable outer sleeve being equal to the distance between the wider ends of the two openings respectively, one of the mutually presented pairs of ends of the fixed and movable sleeves having different radial depth to the radial depth of the other of the pairs of ends, the pair with the smaller radial depth being arranged to be adjacent to the opening with the wider circumferential dimension at its wider end, and when the spaces between the movable and the respective fixed sleeves are equal, the relationship between the exposed areas of the openings and the radial depths of the sleeve ends tends to create a balance of forces acting axially upon the movable sleeve at opposite ends thereof.

2. A device as claimed in claim 1 in which the openings are both triangular and have differing transversely extending base lengths.

References Cited
UNITED STATES PATENTS

| 383,877 | 6/1888 | Gale et al. | 138—46 X |
| 717,278 | 12/1902 | Riess et al. | 138—46 X |
| 1,285,769 | 11/1918 | Melcher | 137—625.3 |
| 3,135,293 | 6/1964 | Hulsey | 137—625.3 X |

HERBERT F. ROSS, Primary Examiner.

U.S. Cl. X.R.
137—625.3